US012536381B2

(12) United States Patent
Haguel

(10) Patent No.: US 12,536,381 B2
(45) Date of Patent: Jan. 27, 2026

(54) SYSTEMS AND METHODS FOR DETECTING STRESS USING ARTIFICIAL INTELLIGENCE

(71) Applicant: NICE LTD., Ra'anana (IL)

(72) Inventor: Tal Haguel, Petah Tikva (IL)

(73) Assignee: NICE LTD., Ra'anana (IL)

(*) Notice: Subject to any disclaimer, the term of this patent is extended or adjusted under 35 U.S.C. 154(b) by 159 days.

(21) Appl. No.: 18/667,370

(22) Filed: May 17, 2024

(65) Prior Publication Data
US 2025/0356130 A1    Nov. 20, 2025

(51) Int. Cl.
G06F 40/30    (2020.01)
G06Q 10/1093    (2023.01)

(52) U.S. Cl.
CPC ......... G06F 40/30 (2020.01); G06Q 10/1093 (2013.01)

(58) Field of Classification Search
CPC ........ G06F 40/30; G06F 9/453; G06F 40/216; G06F 40/35
See application file for complete search history.

(56) References Cited

U.S. PATENT DOCUMENTS

| 10,896,428 | B1* | 1/2021 | Balasubramaniam | G10L 15/1815 |
| 12,217,849 | B2* | 2/2025 | Chaplin | G16H 20/70 |
| 2004/0062363 | A1* | 4/2004 | Shambaugh | H04M 3/51 379/88.01 |
| 2018/0226071 | A1* | 8/2018 | Winter | G10L 15/063 |
| 2022/0230632 | A1* | 7/2022 | Maitra | A61B 5/4803 |
| 2024/0050003 | A1* | 2/2024 | Day | A61B 5/7267 |
| 2024/0289709 | A1* | 8/2024 | Araumi | G06Q 10/063116 |
| 2025/0310280 | A1* | 10/2025 | D'Agostino | G06Q 40/06 |

OTHER PUBLICATIONS

U.S. Appl. No. 18/216,699, filed Jun. 30, 2023.

* cited by examiner

Primary Examiner — Mark Villena
(74) Attorney, Agent, or Firm — Haynes and Boone, LLP

(57) ABSTRACT

Stress detection systems and methods, and non-transitory computer readable media, include building a library including previously identified stressful sentences and stressful phrases; receiving, by a trained neural network model, the library; receiving, by the trained neural network model, a text interaction between a customer and an agent; calculating, by the trained neural network model, a cosine similarity score between each stressful sentence or stressful phrase in the library and each sentence in the text interaction; determining, by the trained neural network model, a probability that the text interaction is stressful based on the calculated cosine similarity score; determining that a percentage of stressful interactions for the agent in a time interval is greater than a threshold percentage; providing a manager with recommended actions to decrease stress on the agent; receiving, from the manager, a selection of one or more recommended actions; and implementing the one or more recommended actions.

20 Claims, 5 Drawing Sheets

SYSTEMS AND METHODS FOR DETECTING STRESS USING ARTIFICIAL INTELLIGENCE

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The present disclosure relates generally to methods and systems for reducing agent churn in contact centers, and more particularly to methods and systems that detect stressful interactions in multichannel interactions to improve customer experience and increase agent satisfaction.

BACKGROUND

A well-known issue in contact centers is that a high percentage of agents churn or leave every year. Costs of attrition in recruiting, training, and retaining are very high. Lack of expertise in new agents increases the number of transfers, repeated interactions with peers and supervisors, and lowers customer satisfaction scores.

One reason behind agent churn is stressful interactions in the contact center. Contact center work can be demanding, and negatively impacts agents' mental health, which often causes anxiety, anger issues, and insomnia, among others. High stress levels can reduce agent productivity and cause absenteeism. All of this can eventually lead to agent burnout and agent churn. Managing stress levels is therefore vital for agent retention and productive agents.

Detecting stressful interactions can create a foundation for churn-reducing interventions. Current methods detect stress in audio signals. Contact centers are, however, rapidly moving from audio interactions to a variety of text-based interactions. Text-based interactions do not have the luxury of the more precise audio signal and so require an alternative approach to the problem.

Accordingly, there is a need for a method to detect and address stress in text-based interactions and digital channels, particularly agent stress.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
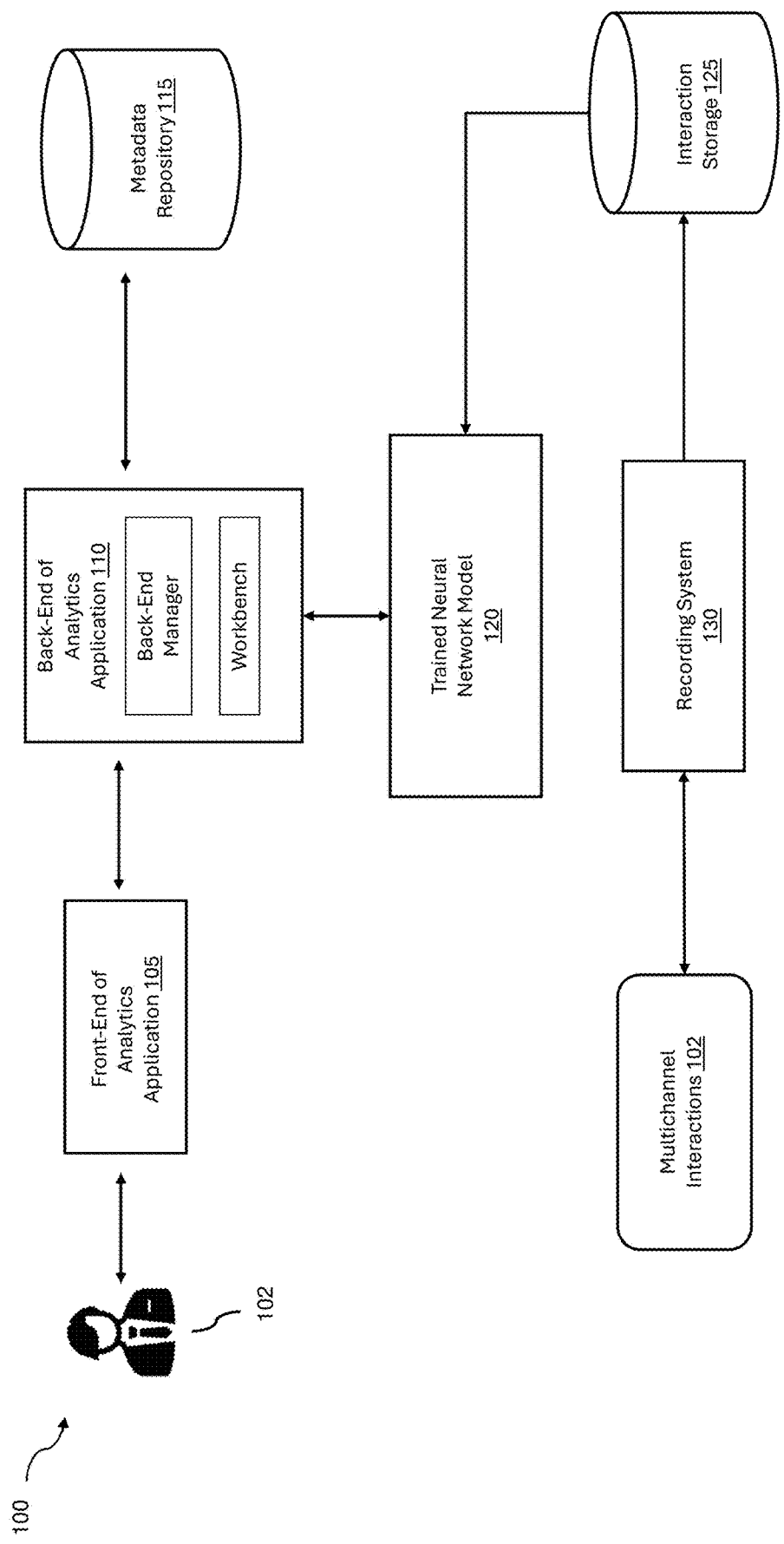
FIG. 1 is a simplified block diagram of an embodiment of a stress detection system according to embodiments of the present disclosure.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present disclosure solves the problem of agent churn by creating a smart lexicon, or library, and a custom neural network (NN) layer that take advantage of stress properties of language by enhancing the relevant language for analysis. By focusing on just the important information, or increasing focus on the more relevant information, the library and the custom NN layer can better detect stressful interactions. Stressful interactions are those interactions that cause worry, strain, or tension for an agent.

The present disclosure describes how to use previously identified stressful sentences and/or stressful phrases to build the library. In one or more embodiments, methods for audio stress detection as disclosed and claimed in U.S. application Ser. No. 18/216,699 filed on Jun. 30, 2023 and titled "System and Method for Detecting Stress in Audio Data," which is incorporated herein by express reference thereto, may be used to identify stressful sentences and/or phrases. Other suitable techniques for such identification known to those of ordinary skill in the art may be used. In other embodiments, sentences and phrases are manually labeled as being stressful. For example, predefined or specific sentences and phrases that are known to be stressful are labeled.

In general, the volume of these previously identified stressful sentences and phrases is very high, and if they are entered into a NN model, there is high complexity, high computation, and low quality to the results. To solve this problem, the present disclosure filters these sentences and phrases by building a library containing only the most relevant sentences and phrases. In one or more embodiments, hierarchical clustering is performed on the sentences and phrases to group or cluster the sentences and phrases that are the most semantically similar. Each cluster is then examined and only the top "x" percent of sentences and phrases in each cluster is selected for inclusion in the library using cosine similarity. Thus, the library contains a significantly reduced number of sentences and phrases compared to the previously identified stressful sentences and phrases. The top percentage may be pre-defined by a user. For example, the top percentage of sentences are those sentences having a cosine similarity score above a certain threshold cosine similarity score.

Many clustering algorithms are used to group objects for analysis and finding patterns. Hierarchical clustering is a popular method for grouping objects. It creates groups so that objects within a group are similar to each other and different from objects in other groups. The hierarchical cluster algorithm is useful in stress determinations because stress can often be explained through cause and effect, or a parent-child relationship. For example, the words that people say before stress and after stress are often related.

One commonly used algorithm is agglomerative clustering, where objects that are close to each other are placed in one group. At the start, all objects are single clusters and the algorithm keeps on clustering objects until a single cluster remains. Clusters are visually represented in a hierarchical tree called a dendrogram.

Agglomerative clustering determines how many clusters should be used and what the sentences and phrases in each cluster are. The algorithm includes the following steps: (1) start with each sentence (or phrase) as a cluster; (2) find the semantic distances between all clusters; (3) group the pair of clusters with the minimum semantic distance into a new cluster; (4) find the semantic distances between clusters, including the new cluster; and (5) keep on clustering until one single cluster is left.

Semantic similarity refers to the degree of similarity between words, phrases, or sentences. The focus is on the structure and lexical resemblances of words and phrases. Therefore, the smaller the semantic distance between words, phrases, or sentences, the more semantically similar they are.

To determine how many clusters to use, a specific semantic distance is selected and drawn as a horizontal line on the dendrogram. In one embodiment, the average semantic distance of all sentences and phrases is selected. The number of vertical lines the horizontal line passes through provides the number of clusters to use. A dendrogram is a tree diagram often used to visualize the results of hierarchical clustering. A dendrogram can be complex and is generated by the algorithm.

At this point, there are still the same number of sentences and phrases, but they are divided into "y" number of clusters (or the number of clusters to use). To reduce the number of sentences and phrases, the cosine similarity score between each sentence and phrase in each cluster of the "y" number of clusters is computed and only the sentences and phrases having a cosine similarity score above a specific threshold are selected for inclusion in the library. In an exemplary embodiment, the threshold cosine similarity score is 0.6.

In data analysis, cosine similarity is a measure of similarity between two non-zero vectors defined in an inner product space. An advantage of cosine similarity is its low complexity. Cosine similarity is often used to measure document similarity in text analysis. For example, in information retrieval and text mining, each word is assigned a different coordinate, and a document is represented by the vector of the numbers of occurrences of each word in the document. Cosine similarity gives a useful measure of how similar two documents are likely to be, in terms of their subject matter, and independently of the length of the documents. The technique is also used to measure cohesion within clusters in data mining.

Cosine similarity is the cosine of the angle between the vectors. In other words, cosine similarity is the dot product of the vectors divided by the product of their lengths. It follows that cosine similarity does not depend on the magnitude of the vectors, but only on their angle. The cosine similarity score generally falls within −1 and 1. For example, two proportional vectors have a cosine similarity score of 1, two orthogonal vectors have a cosine similarity score of 0, and two opposite vectors have a cosine similarity score of −1. In some contexts, the component values of the vectors cannot be negative, and the cosine similarity score falls within 0 and 1. Table 1 below is provided to further illustrate cosine similarity. Sentence 1 has a cosine similarity score of 1 with itself since it is being compared to the same sentence, is less similar to sentence 2, and is most dissimilar with sentence n.

TABLE 1

COSINE SIMILARITY SCORES

| Cosine similarity score | Sentence 1 | Sentence 2 | Sentence n |
| --- | --- | --- | --- |
| Sentence 1 | 1 | 0.6 | −0.1 |
| Sentence 2 | 0.6 | 1 | 0.3 |
| Sentence n | −0.1 | 0.3 | 1 |

After the cosine similarity scores are obtained, the library is populated with the sentences and phrases in each cluster having a cosine similarity score above the specified threshold score. The sentences and phrases are greatly reduced (e.g., 50% reduced, 60% reduced, 70% reduced, 80% reduced, or even more) from the original number of sentences and phrases. Once a new customer-agent interaction is received, it is converted to text (if needed). This text interaction and the library are provided to the NN model. In some embodiments, an embedding layer of the NN model converts the text interaction and the library into numerical representations, or vectors. In various embodiments, a custom layer of the NN model calculates the cosine similarity score between each vectorized sentence or phrase in the library and each vectorized sentence in the text interaction. The output of the NN model is the probability that the text interaction is a stressful interaction. For example, if the probability is greater than 50%, then the text interaction is considered a stressful interaction. If the probability is less than 50%, then the text interaction is not a stressful interaction.

In certain embodiments, once a stressful interaction is identified, the portion of the text interaction that contains the stress is automatically sent to quality management. Agent information for that text interaction is also collected and provided to quality management. In some embodiments, a quality management supervisor is provided a list of agents that have encountered stressful interactions and recommended actions to decrease stress on the agents. In several embodiments, the recommended action is based on a percentage of stressful interactions handled by an agent in a certain time interval. In one embodiment, the number of stressful interactions handled by an agent is divided by the total number of interactions for the time interval. If the percentage is greater than a threshold percentage, the supervisor is provided with recommended actions. The greater the percentage of stressful interactions, the stronger the recommended actions for decreasing stress.

In one or more embodiments, the quality management supervisor selects one or more recommended actions on the quality management application or dashboard, and the quality management application implements the one or more recommended actions. The recommended actions can include automatic or manual interventions such as shuffling break schedules or assigning meditation.

Referring now to FIG. 1, shown is a stress detection system 100 according to embodiments of the present disclosure. The stress detection system 100 includes a front-end of the analytics application 105 (e.g., quality management application), a back-end of the analytics application 110, a metadata repository 115, a trained NN model 120, interaction storage 125, and a recording system 130. Once a multichannel interaction 102 (e.g., text, audio, or video interaction) occurs, it is sent to the recording system 130. When the multichannel interaction 102 ends, the recording is saved in interaction storage 125 as a file. At a certain time (e.g., at a certain period of the day or triggered manually), the library stored in the metadata repository 115 and the trained NN model 120 are loaded to the memory of the back-end of the analytics application 110. When a quality management supervisor 102 logs on to the front-end of the analytics application 105, he/she goes to the relevant location in the application to see stressful interaction information. Once he/she enters the dashboard, he/she sees new notifications or events.

In certain embodiments, quality manager supervisor 102 requests the notifications or events. The request is sent from the front-end of the analytics application 105 to the back-end of the analytics application 110. The back-end of the analytics application 110 receives the request and retrieves a past stress detection prediction from metadata repository 115 if available. If the metadata repository 115 does not have a previous stress detection prediction, the metadata repository 115 extracts the relevant metadata and the requested transcription/text interaction that was chosen according to a certain time period. The time periods may be predefined or selected by a user, or based on the length of an agent-customer interaction, for example. The workbench is invoked to get the predicted values and build the file. The response is then aggregated and sent back to the front-end of the analytics application 105. The information is displayed to quality management supervisor 102 under the relevant agent interaction summary information. The back-end service predicts the relevant probability of a stressful interaction using the trained NN model 120 and updates in parallel the metadata repository 115 with the new information.

In various embodiments, the trained NN model 120 is trained to output the probability that an interaction is a stressful interaction. After the NN model 120 is trained with new inputs, the stress prediction for all the relevant agents under the quality management supervisor 102 is stored in the metadata repository 115 per agent. At the end of each day or after a certain period of time (e.g., after an agent's shift ends), the stress detection prediction is entered into the metadata repository 115 per agent. In the repository quality management section, for each agent, the number of interactions per day (or time period) and the number of stressful interactions detected in total day (or time period) interactions is stored. As an example, if an agent had 5 stress predictions or stressful interactions out of 100 total interactions per day, then the agent will have 5% stress percentage per day.

When the quality management supervisor 102 logs on to the front-end of the analytics application 105, the back-end of the analytics application 110 connects to the metadata repository 115 to retrieve the stress percentage per the interval of time (the default interval of time can be once a day) for all the agents associated with quality management supervisor 102.

Figure 2:
FIG. 2 is an exemplary screenshot of stress percentages of agents according to embodiments of the present disclosure.

In one or more embodiments, the quality management supervisor 102 is presented with the screenshot 200 provided in FIG. 2. FIG. 2 provides the stress percentage for agents 1, 2, and 3 for the day. Agent 1 has the highest stress percentage out of all three agents. Contact centers can determine what the value of the stress percentage needs to be to trigger recommendations of decreasing stress. The default stress percentage can be a threshold of more than 20%, although this threshold may be adjusted in advance or at any time by a user, such as a supervisor or other manager. In some embodiments, the quality management supervisor 102 can press on each agent button 205, 210, 215, and automatic recommendation steps are provided.

In one or more embodiments, the options are created based on the severity of the stress percentage. If the stress percentage is above 50%, the front-end of analytics application 105 will recommend immediate schedule intervention. If possible, for example, the system will send the agent to an immediate break session or an immediate coaching session, according to the stressful interaction topics.

Figure 3:
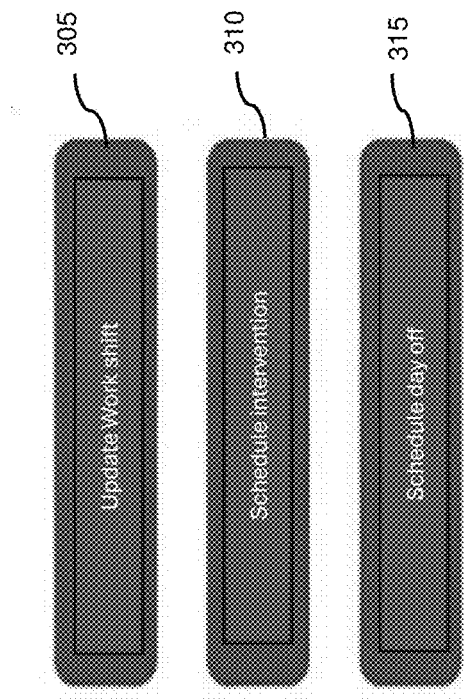
FIG. 3 illustrates different options for automatic intervention according to embodiments of the present disclosure.

Referring now to FIG. 3, shown are three (3) possibilities for automatic intervention. Button 305 relates to updating the work shift. When quality management supervisor 102 presses button 305, the weekly work shift of the agent is opened and quality management supervisor 102 can update a relevant shift for the agent or use an automatic suggestion option that suggests the best work shift update according to other agents' availability for that week. Button 310 relates to schedule intervention. When quality management supervisor 102 presses button 310, a vendor application opens so that quality management supervisor 102 can schedule a relevant class for the agent such as yoga, Pilates, kickboxing, dancing, tai chi, or other stress relief class for the first available time. Button 315 is associated with scheduling a day off. When quality management supervisor 102 presses button 315, the availability of the next possible day off for the agent is opened automatically on the agent calendar. Quality management supervisor 102 can then approve the day off, and an automatic update to the agent's schedule is made in the system.

Figure 4:
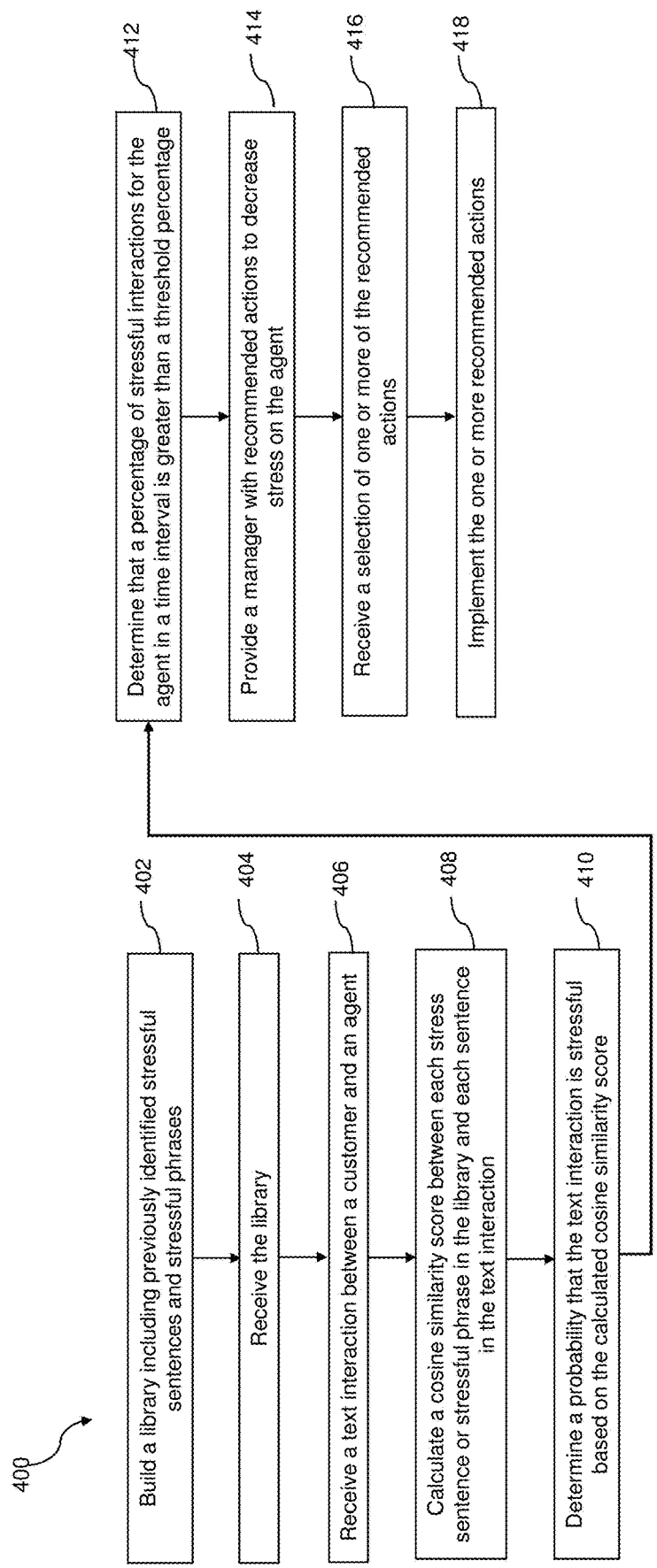
FIG. 4 is a flowchart of a method according to embodiments of the present disclosure.

FIG. 4 shows an exemplary method 400 for detecting and treating stress in a contact center according to the present disclosure. In step 402, the back-end of analytics application 110 builds a library that includes previously identified stressful sentences and stressful phrases. In one or more embodiments, building the library includes receiving sentences and phrases in a customer interaction that show stress, reducing the number of sentences and phrases, and using identified sentences and phrases to build the library. In various embodiments, identifying the sentences and phrases in the customer interaction that show stress includes applying an audio stress detection algorithm to the sentences and phrases in the customer interaction or labeling predefined words in the sentences or phrases in the customer interaction.

In some embodiments, the number of sentences and phrases are reduced by grouping the sentences and phrases into clusters via a hierarchical cluster algorithm, calculating a cosine similarity score between each sentence and phrase in each cluster, and identifying sentences and phrases in each cluster having a cosine similarity score above a threshold score. In some embodiments, the hierarchical cluster algorithm includes an agglomerative clustering algorithm.

In step 404, the trained NN model 120 receives the library. In some embodiments, the library and trained NN model 120 are stored. For example, the library can be stored in metadata repository 115. The NN model 120 is stored after it is trained to output a probability of a stressful interaction, and in some embodiments, the trained NN model 120 is trained with new information, updated, and stored.

In step 406, the trained NN model 120 receives a text interaction between a customer and an agent. In some embodiments, the text interaction between the customer and the agent includes text of one or more of a telephone call, a facsimile transmission, an e-mail, a chat, a web interaction, a voice over IP ("VoIP"), a video, or any combination thereof.

In step 408, the trained NN model 120 calculates a cosine similarity score between each stressful sentence or stressful phrase in the library and each sentence in the text interaction.

In step 410, the trained NN model 120 determines a probability that the text interaction is stressful based on the calculated cosine similarity score.

In step 412, the back-end of analytics application 110 determines that a percentage of stressful interactions for the agent in a time interval is greater than a threshold percentage. In one embodiment, the time interval is a day. In other embodiments, the time interval can be a work shift, a work week, or any other time interval set by the manager.

In step 414, the front-end of analytics application 105 provides a manager with recommended actions to decrease stress on the agent. In some embodiments, the recommended actions include updating a work shift, scheduling an intervention, scheduling a day off, or any combination thereof.

In step 416, the front-end of analytics application 105 receives, from the manager, a selection of one or more of the recommended actions.

In step 418, the back-end of analytics application 110 implements the one or more recommended actions.

The trained NN model 120 was tested on about 20,000 interactions and compared to the baseline model using a standard feed-forward network on the transcript only. The results are shown in Table 2. The trained NN 120 demonstrated an average improvement over the baseline model of about 4 percentage points. Precision is a metric that measures how often a machine learning model correctly predicts the positive class. Precision is calculated by dividing the correct positive predictions (true positives) by the total number of instances the model predicted as positive (both true and false positives). The higher the precision, the better. As can be seen, the precision of the trained NN model 120 increased from 52% to 56% and 62% to 66% based on this exemplary embodiment. Recall is a standard measurement for NN quality and measures how often a machine learning model correctly identifies positive instances (true positives) from all the actual positive samples in the dataset. Recall is calculated by dividing the number of true positives by the number of positive instances. The number of positive instances includes true positives (successfully identified cases) and false negative results (missed cases). The higher the recall, the better. As can be seen, the recall of the trained NN model 120 increased from 66% to 70% and from 48% to 51%. This means the trained NN model 120 predicted more results correctly than the baseline model. Accordingly, the trained NN model 120 provides a technical improvement or advance over previously used algorithms.

TABLE 2

RESULTS OF TRAINED NN MODEL

| Classification | Baseline Model | | Trained NN Model | | |
| --- | --- | --- | --- | --- | --- |
| | Precision | Recall | Precision | Recall | Change |
| No Stress | 0.52 | 0.66 | 0.56 | 0.7 | ~+4% |
| Stress | 0.62 | 0.48 | 0.66 | 0.51 | ~+4% |

Figure 5:
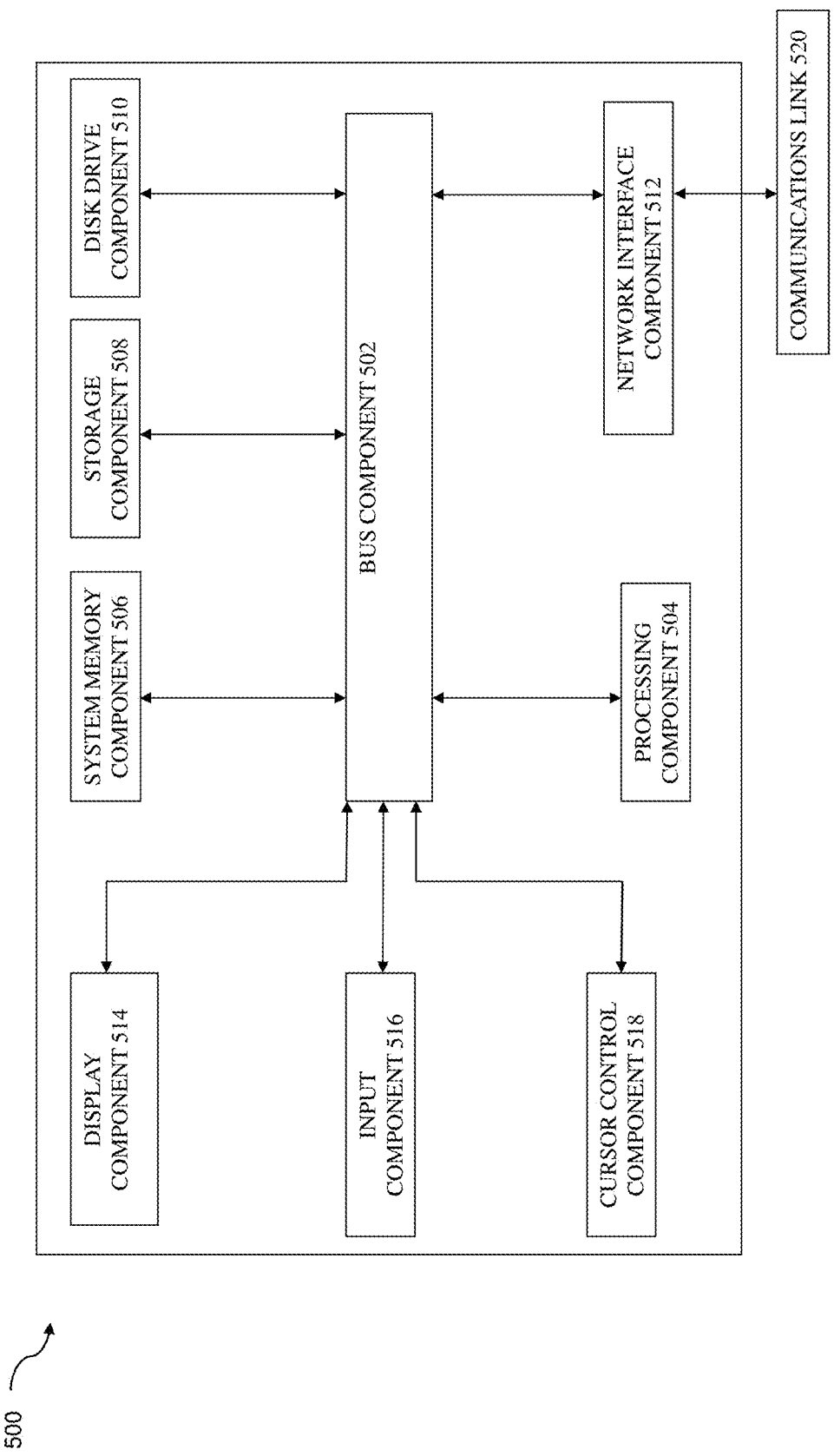
FIG. 5 is a block diagram of a computer system suitable for implementing one or more components in FIG. 1 according to one embodiment of the present disclosure.

Referring now to FIG. 5, illustrated is a block diagram of a system 500 suitable for implementing embodiments of the present disclosure. System 500, such as part of a computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to build a library comprising previously identified stressful sentences and stressful phrases; receive, by a trained NN model, the library; receive, by the trained NN model, a text interaction between a customer and an agent; calculate, by the trained NN model, a cosine similarity score between each stressful sentence or stressful phrase in the library and each sentence in the text interaction; determining, by the trained NN model, a probability that the text interaction is stressful based on the calculated cosine similarity score; determine that a percentage of stressful interactions for the agent in a time interval is greater than a threshold percentage; provide a manager with recommended actions to decrease stress on the agent; receive, from the manager, a selection of one or more of the recommended actions; and implement the one or more recommended actions. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A stress detection system comprising:
    a processor and a non-transitory computer readable medium operably coupled thereto, the non-transitory computer readable medium comprising a plurality of instructions stored in association therewith that are accessible to, and executable by, the processor, to perform operations which comprise:
        building a library comprising previously identified stressful sentences and stressful phrases;
        receiving, by a trained neural network model, the library;
        receiving, by the trained neural network model, a text interaction between a customer and an agent;
        calculating, by the trained neural network model, a cosine similarity score between each stressful sentence or stressful phrase in the library and each sentence in the text interaction;
        determining, by the trained neural network model, a probability that the text interaction is stressful based on the calculated cosine similarity score;
        determining that a percentage of stressful interactions for the agent in a time interval is greater than a threshold percentage;
        providing a manager with recommended actions to decrease stress on the agent;
        receiving, from the manager, a selection of one or more of the recommended actions; and
        implementing the one or more recommended actions.
2. The stress detection system of claim 1, wherein building the library comprises:
    receiving sentences and phrases in a customer interaction that show stress;
    reducing the number of sentences and phrases by:
        grouping the sentences and phrases into clusters via a hierarchical cluster algorithm,
        calculating a cosine similarity score between each sentence and phrase in each cluster, and
        identifying sentences and phrases in each cluster having a cosine similarity score above a threshold score; and
    using the identified sentences and phrases to build the library.
3. The stress detection system of claim 2, wherein the operations further comprise identifying the sentences and phrases in the customer interaction that show stress by applying an audio stress detection algorithm to the sentences and phrases in the customer interaction or labeling predefined words in the sentences or phrases in the customer interaction.
4. The stress detection system of claim 2, wherein the hierarchical cluster algorithm comprises an agglomerative clustering algorithm.
5. The stress detection system of claim 1, wherein the time interval is a day.
6. The stress detection system of claim 1, wherein the recommended actions comprise updating a work shift, scheduling an intervention, scheduling a day off, or any combination thereof.
7. The stress detection system of claim 1, wherein the text interaction between the customer and the agent comprises text of one or more of a telephone call, a facsimile transmission, an e-mail, a chat, a web interaction, a voice over IP ("VOIP"), a video, or any combination thereof.
8. The stress detection system of claim 1, wherein the operations further comprise storing the library and the trained neural network model.
9. A method for detecting and treating stress in a contact center, which comprises:
    building a library comprising previously identified stressful sentences and stressful phrases;
    receiving, by a trained neural network model, the library;
    receiving, by the trained neural network model, a text interaction between a customer and an agent;
    calculating, by the trained neural network model, a cosine similarity score between each stressful sentence or stressful phrase in the library and each sentence in the text interaction;
    determining, by the trained neural network model, a probability that the text interaction is stressful based on the calculated cosine similarity score;
    determining that a percentage of stressful interactions for the agent in a time interval is greater than a threshold percentage;
    providing a manager with recommended actions to decrease stress on the agent;
    receiving, from the manager, a selection of one or more of the recommended actions; and
    implementing the one or more recommended actions.
10. The method of claim 9, wherein building the library comprises:
    receiving sentences and phrases in a customer interaction that show stress;
    reducing the number of sentences and phrases by:
        grouping the sentences and phrases into clusters via a hierarchical cluster algorithm,
        calculating a cosine similarity score between each sentence and phrase in each cluster, and
        identifying sentences and phrases in each cluster having a cosine similarity score above a threshold score; and
    using the identified sentences and phrases to build the library.
11. The method of claim 10, which further comprises identifying the sentences and phrases in the customer interaction that show stress by applying an audio stress detection algorithm to the sentences and phrases in the customer interaction or labeling predefined words in the sentences or phrases in the customer interaction.
12. The method of claim 10, wherein the hierarchical cluster algorithm comprises an agglomerative clustering algorithm.

13. The method of claim 9, wherein the recommended actions comprise updating a work shift, scheduling an intervention, scheduling a day off, or any combination thereof.

14. The method of claim 9, wherein the text interaction between the customer and the agent comprises text of one or more of a telephone call, a facsimile transmission, an e-mail, a chat, a web interaction, a voice over IP ("VoIP"), a video, or any combination thereof.

15. The method of claim 9, which further comprises storing the library and the trained neural network model.

16. A non-transitory computer-readable medium having stored thereon computer-readable instructions executable by a processor to perform operations which comprise:
   building a library comprising previously identified stressful sentences and stressful phrases;
      receiving, by a trained neural network model, the library;
      receiving, by the trained neural network model, a text interaction between a customer and an agent;
      calculating, by the trained neural network model, a cosine similarity score between each stressful sentence or stressful phrase in the library and each sentence in the text interaction;
      determining, by the trained neural network model, a probability that the text interaction is stressful based on the calculated cosine similarity score;
      determining that a percentage of stressful interactions for the agent in a time interval is greater than a threshold percentage;
      providing a manager with recommended actions to decrease stress on the agent;
      receiving, from the manager, a selection of one or more of the recommended actions; and
      implementing the one or more recommended actions.

17. The non-transitory computer-readable medium of claim 16, wherein building the library comprises:
   receiving sentences and phrases in a customer interaction that show stress;
   reducing the number of sentences and phrases by:
      grouping the sentences and phrases into clusters via a hierarchical cluster algorithm,
      calculating a cosine similarity score between each sentence and phrase in each cluster, and
      identifying sentences and phrases in each cluster having a cosine similarity score above a threshold score; and
   using the identified sentences and phrases to build the library.

18. The non-transitory computer-readable medium of claim 17, wherein the operations further comprise identifying the sentences and phrases in the customer interaction that show stress by applying an audio stress detection algorithm to the sentences and phrases in the customer interaction or labeling predefined words in the sentences or phrases in the customer interaction.

19. The non-transitory computer-readable medium of claim 16, wherein the recommended actions comprise updating a work shift, scheduling an intervention, scheduling a day off, or any combination thereof.

20. The non-transitory computer-readable medium of claim 16, wherein the text interaction between the customer and the agent comprises text of one or more of a telephone call, a facsimile transmission, an e-mail, a chat, a web interaction, a voice over IP ("VoIP"), a video, or any combination thereof.

* * * * *